Sept. 5, 1967  R. COVER  3,339,314
CUTTER BLADE HONING MACHINE

Filed Dec. 30, 1964  10 Sheets-Sheet 1

INVENTOR
RALPH COVER
BY
Mason, Porter, Diller & Stewart
ATTORNEYS

Sept. 5, 1967  R. COVER  3,339,314

CUTTER BLADE HONING MACHINE

Filed Dec. 30, 1964  10 Sheets-Sheet 3

INVENTOR
RALPH COVER

BY
Mason, Porter, Diller & Stewart
ATTORNEY

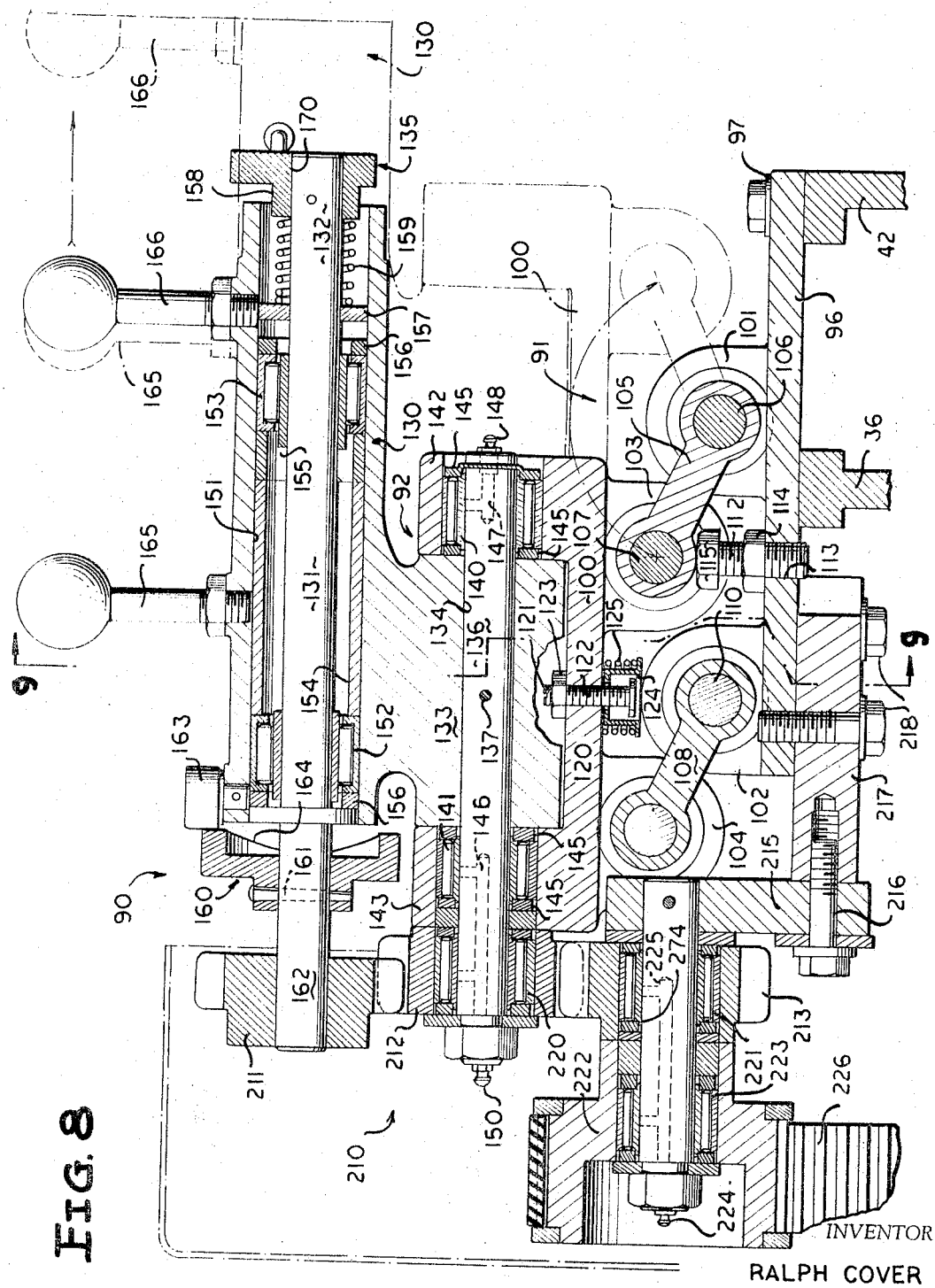

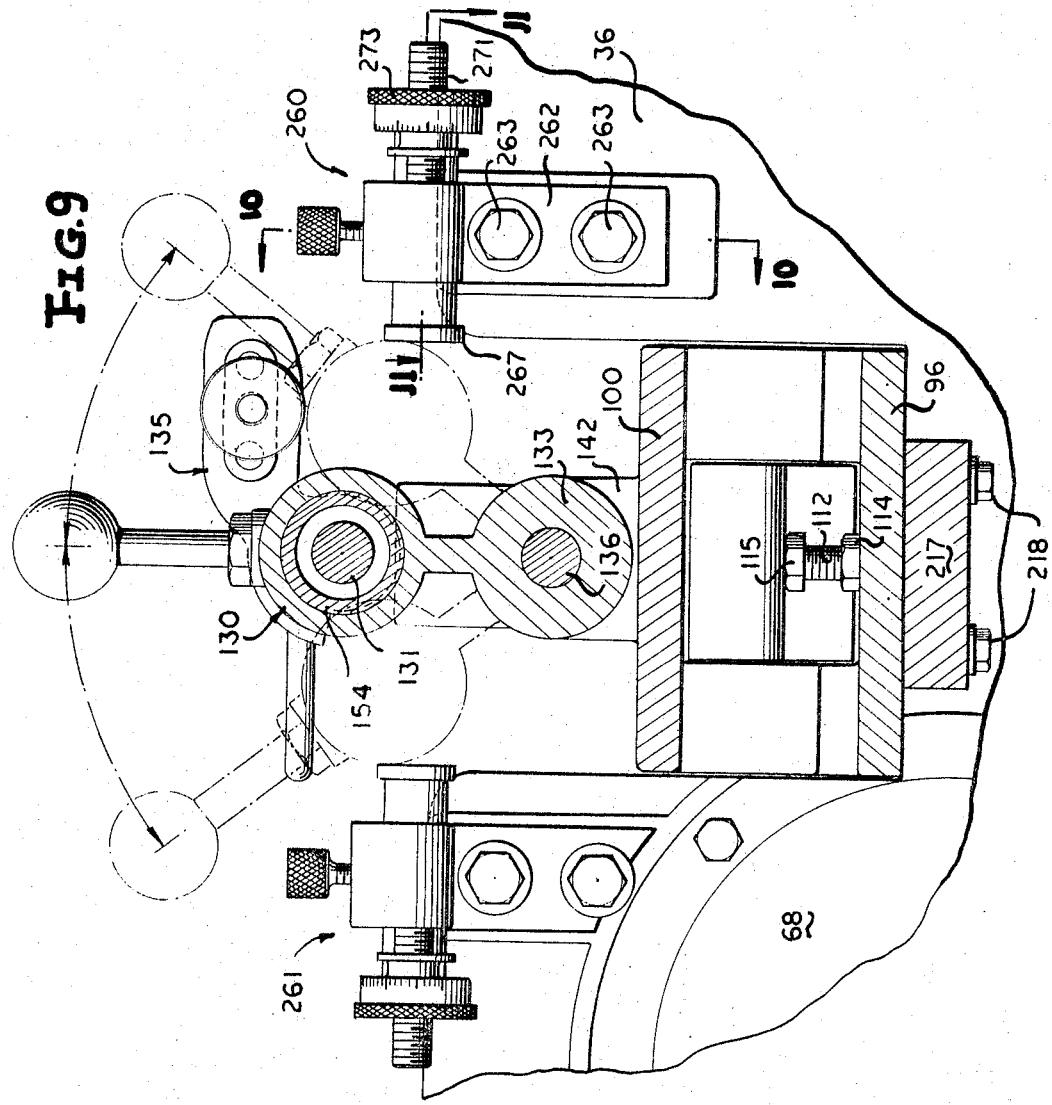

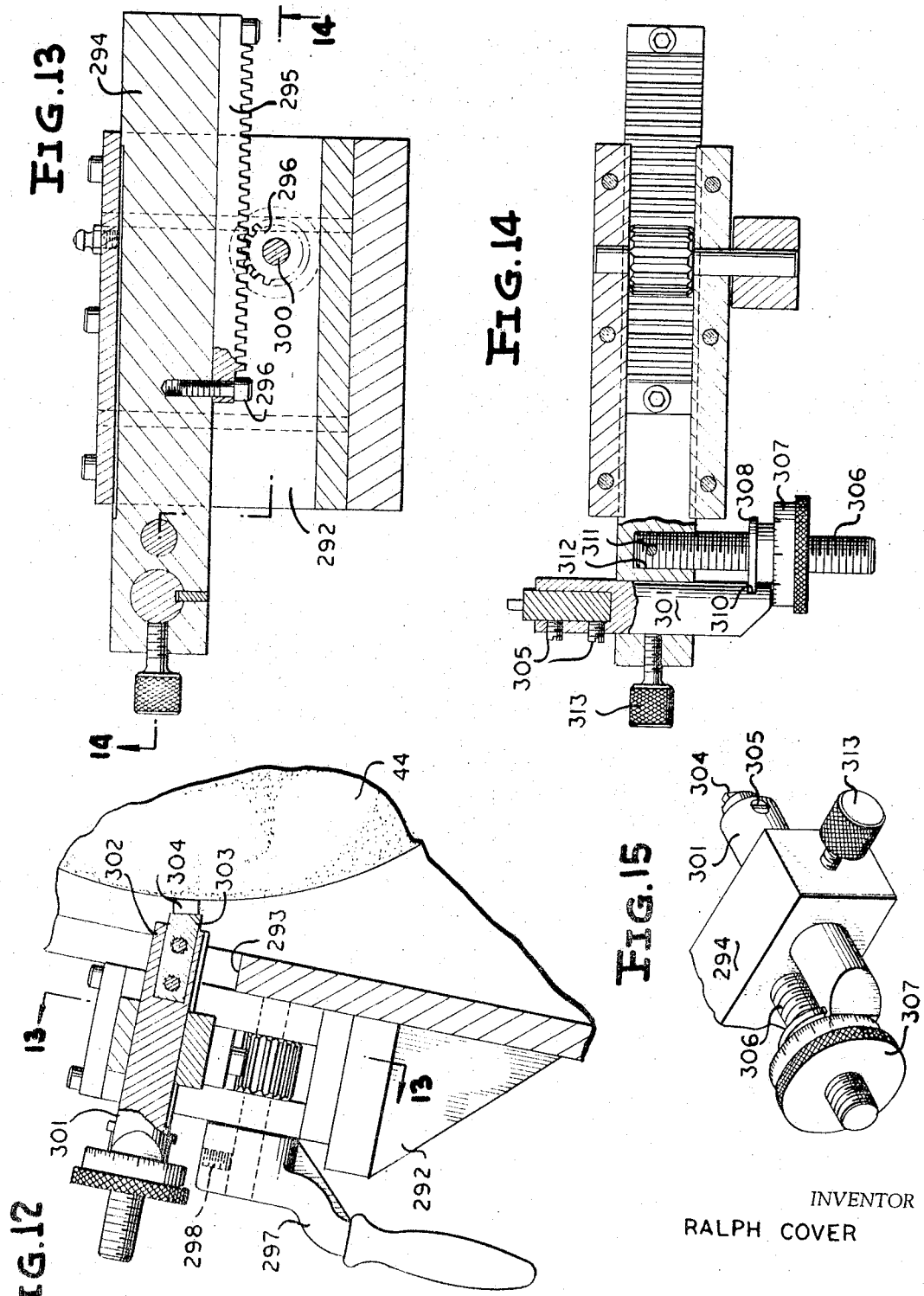

Sept. 5, 1967  R. COVER  3,339,314
CUTTER BLADE HONING MACHINE
Filed Dec. 30, 1964  10 Sheets-Sheet 9
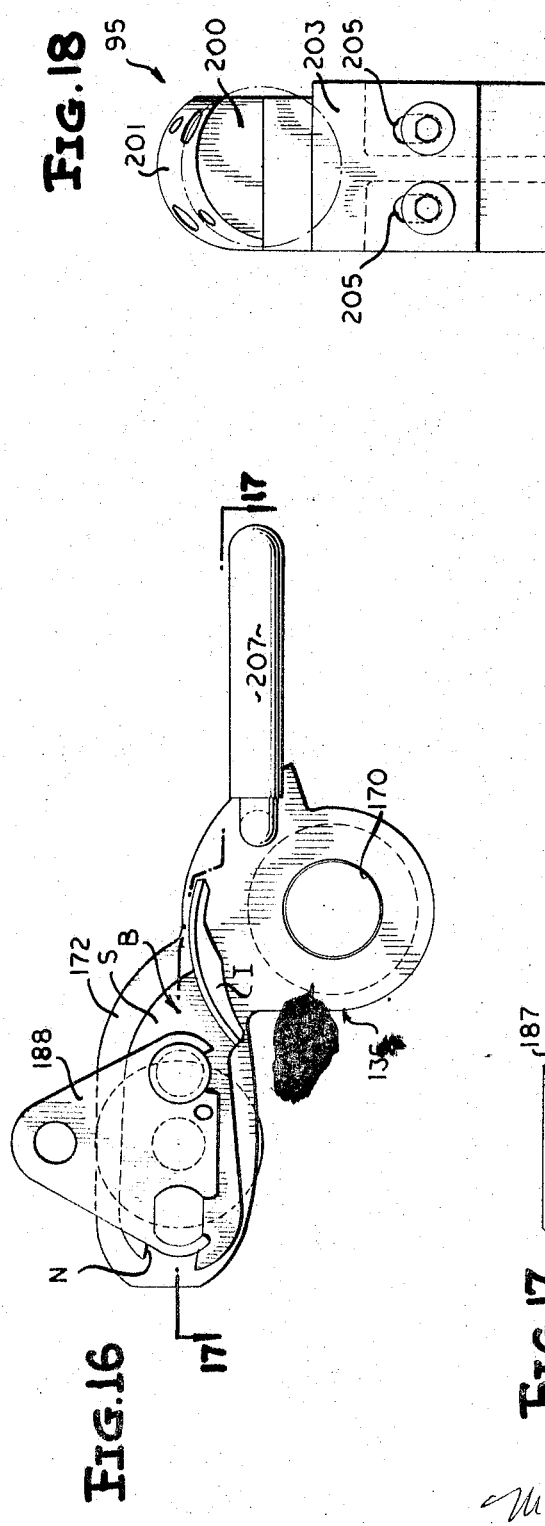
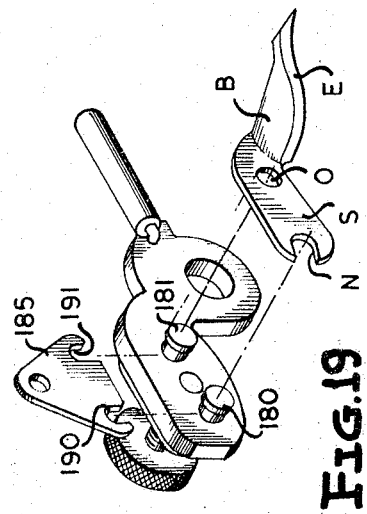
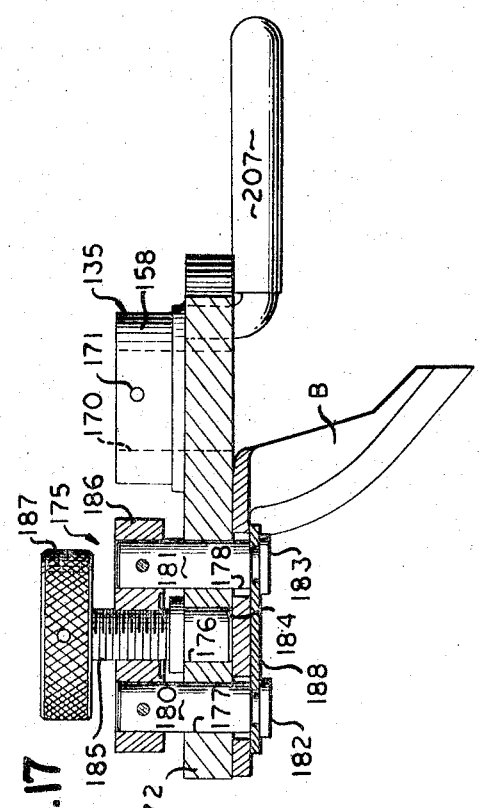
INVENTOR
RALPH COVER
BY
Mason, Porter, Diller & Stewart
ATTORNEYS

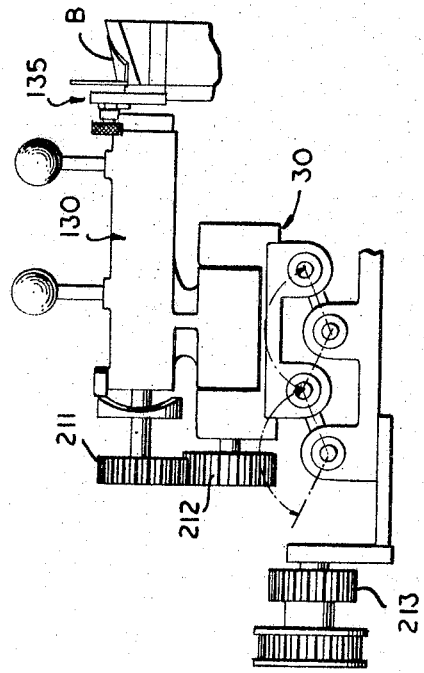
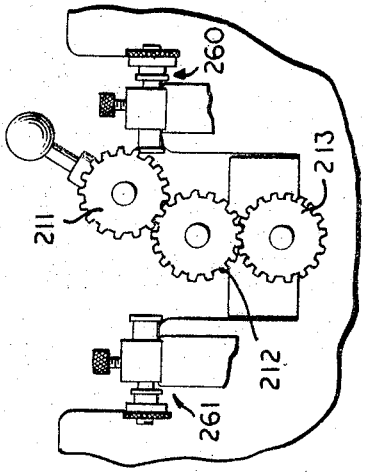
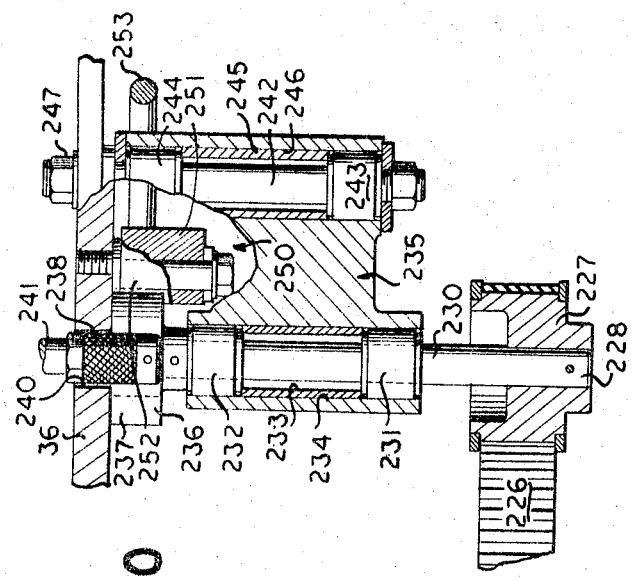
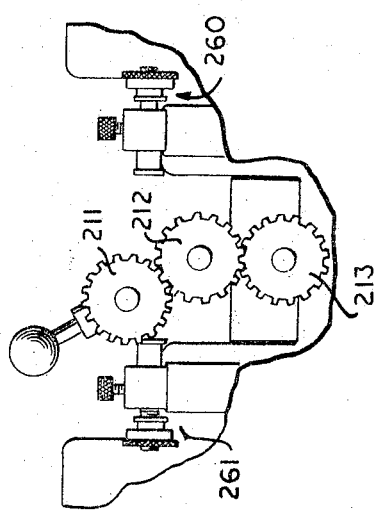

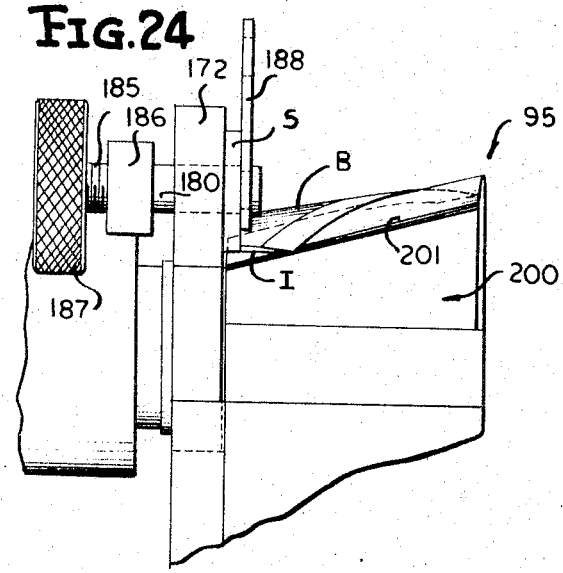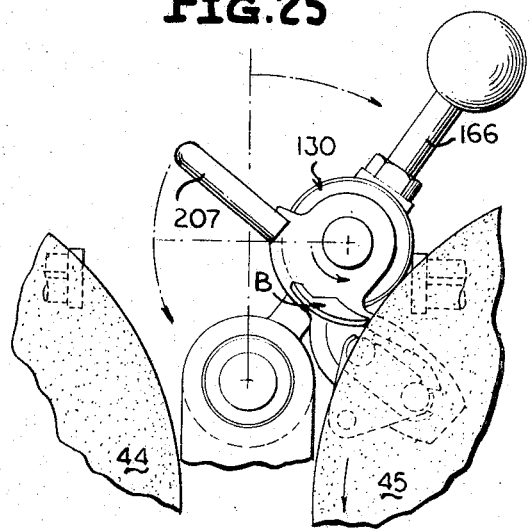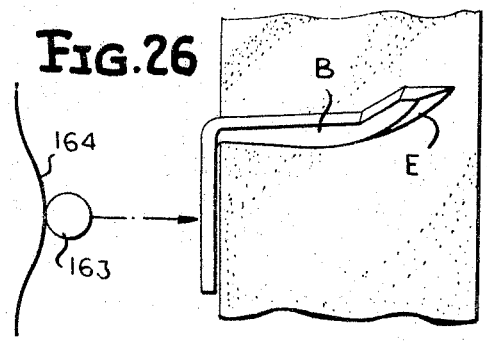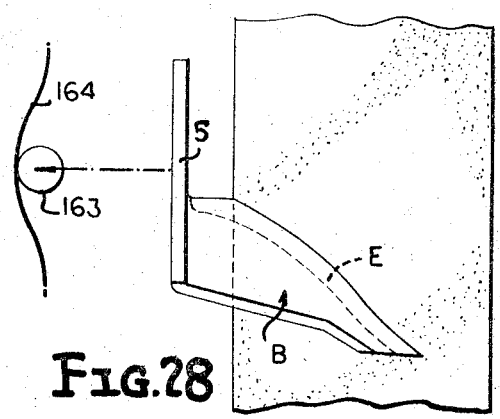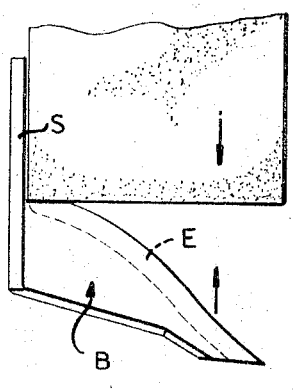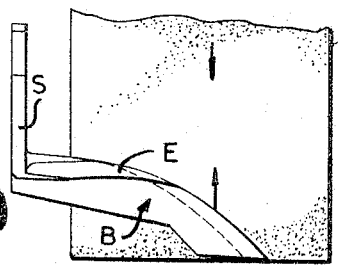
INVENTOR
RALPH COVER

United States Patent Office 3,339,314
Patented Sept. 5, 1967

3,339,314
CUTTER BLADE HONING MACHINE
Ralph Cover, Box 390, Westminster, Md. 21157
Filed Dec. 30, 1964, Ser. No. 422,122
20 Claims. (Cl. 51—95)

This invention relates to a novel honing or sharpening machine, and more particularly to an abrading apparatus for rapidly and accurately sharpening the cutting edges of blades used in corn cutting machines.

An example of corn cutting machines or cutter heads of the character referred to is disclosed in U.S. Letters Patent 2,141,346, issued to Ralph Cover on Dec. 27, 1938. In these and comparable machines, means are provided for feeding the ears of corn longitudinally through cutting means comprising a plurality of spreadable carriers with cutting blades removably mounted thereon, said blades being sharpened to present curved cutting edges conforming generally to the external curvature of the corn ears and extending as partial helices about external portions of the corn ears, and cut depth controlling means also being provided in association with the carriers and engageable with the external surfaces of the corn ears in a manner for preventing the blade edges from pentrating too deeply into the corn ears during a cutting process. The cutting blades must be very accurately and uniformly mounted in order to assure efficient and unwasteful cutting of the corn, and unless the edges of the blades are sharpened by means to be described hereafter, it is virtually impossible to accurately and uniformly shaped and sharpen the generally helical cutting edges of such blades. In accordance with this invention, it is a primary purpose to provide a novel apparatus by which blades of the character stated can be rapidly and accurately sharpened or honed with absolute assurance that the cutting edge shape will be maintained and an extremely sharp cutting edge will be effected by a preliminary rough sharpening and a secondary finer sharpening to insure cutting edge perfection.

An object of this invention is to provide a novel machine of the character stated in which is included positioning means engageable by a blade to be sharpened for accurately positioning the blade edge with respect to a pair of abrading or sharpening wheels, and means for translating an edge between a first rough abrading wheel to a secondary smoother abrading wheel to assure a limited removal of material and an extremely sharp cutting edge of each of the blades so transferred between the abrading wheels.

A further object of this invention is to provide a novel apparatus of the type described in which each blade which is to be sharpened is carried by a blade carrier fixed to an arm supported generally between and parallel to the axes of the pair of abrading wheels, the arm being supported by first and second mounting means for permitting movement of the arm and a blade carried thereby in a direction generally parallel to the abrading wheel axes for introducing each blade to a positioning device and thereafter swinging the blade in directions generally normal to the first direction to present each blade edge to the abrading wheels.

A further object of this invention is to provide a novel apparatus of the type above described including an eccentric-operated clutch mechanism for imparting rotation to the blade-carrying arm for rotating each blade carried thereby during a honing operation, and further including cam and cam follower means for oscillating or reciprocating the arm and blade carrier during a honing operation.

A further object of this invention is to provide a novel abrading or honing apparatus of the type described including stop means incrementally adjustable to limit swinging movement of the arm and a blade carried thereby in directions normal to the abrading wheel axes to limit the material removed from each blade edge.

A further object of this invention is to provide a novel honing machine of the type described, and further including means for dressing each of the abrading wheels.

With the above and other objects in view that will hereinafter appear, the nature of the invention will be more clearly understood by reference to the following detailed description, the appended claims and the several views illustrated in the accompanying drawings.

In the drawings:

FIGURE 8 is an enlarged longitudinal sectional view taken along line 8—8 of FIGURE 5, and more clearly illustrates the mounting means for imparting the parallel and normal movements to the blade carrying arm during a honing operation.

FIGURE 9 is an enlarged fragmentary vertical cross-sectional view taken generally along line 9—9 of FIGURE 8, and illustrates the blade carrier arm mounted in a sleeve movable between the phantom outline positions thereof and limited in such movement by a pair of adjustable stop mechanisms.

FIGURE 10 is a fragmentary sectional view taken along line 10—10 of FIGURE 9, and illustrates one of the adjustable stop mechanisms.

FIGURE 11 is a horizontal sectional view taken along line 11—11 of FIGURE 9, and illustrates other details of the stop mechanism.

FIGURE 12 is an enlarged fragmentary sectional view of one of the abrading or honing wheel dressers, and illustrates adjustable components thereof for incrementally advancing and/or retracting a diamond dresser.

FIGURE 13 is an enlarged cross-sectional view taken generally along line 13—13 of FIGURE 12, and illustrates a movable rack of the wheel dresser.

FIGURE 14 is a detailed sectional view taken generally along line 14—14 of FIGURE 13, and illustrates further details of the wheel dresser.

FIGURE 15 is a fragmentary perspective view illustrating a micro-nut of the wheel dresser of FIGURES 12–14.

FIGURE 16 is a detailed front elevational view of a knife holder or carrier and illustrates a knife cutter or blade attached thereto.

FIGURE 17 is a detailed sectional view taken generally along line 17—17 of FIGURE 16, and illustrates a mechanism for securing the cutter blade to the blade carrier.

FIGURE 18 is a fragmentary end elevational view of a locating or positioning block for positioning the blade prior to the secure fastening thereof to the blade carrier.

FIGURE 19 is an exploded perspective view illustrating the components thereof and the blade prior to being assembled.

FIGURE 20 is a fragmentary enlarged sectional view taken generally along line 20—20 of FIGURE 5, and more clearly discloses the specific construction of the eccentric type clutch for imparting rotation to the gears for rotating the blade carrier arm.

FIGURE 21 is a diagrammatic reduced fragmentary side elevational view of the honing machine and illustrates a shifted position thereof with the blade positioned upon the gage or locating block prior to the initiation of an abrading operation.

FIGURES 22 and 23 are fragmentary diagrammatic rear views of the honing machine, and illustrate the gear drive for rotating the carrier arm and blade in either of two shifted positions thereof.

FIGURE 24 is a fragmentary side elevational view illustrating the location of a cutter blade upon the locating or positioning device prior to a honing operation.

FIGURE 25 is a fragmentary generally diagrammatic front elevational view of the blade carrier, and illustrates the initial position of contact of the cutter blade against a coarse one of the abrading wheels.

FIGURE 26 is a diagrammatic side elevational view illustrating the initial contact position of the cutter shown in FIGURE 25.

FIGURE 27 is a plan view of the parts illustrated in FIGURE 26.

FIGURE 28 is a diagrammatic view similar to FIGURE 26 and illustrates the cutter or blade in its final position of contact incidental to being positioned in sharpening engagement with one of the abrading or grinding wheels.

FIGURE 29 is a plan view of the parts shown in FIGURE 28.

Figure 1:
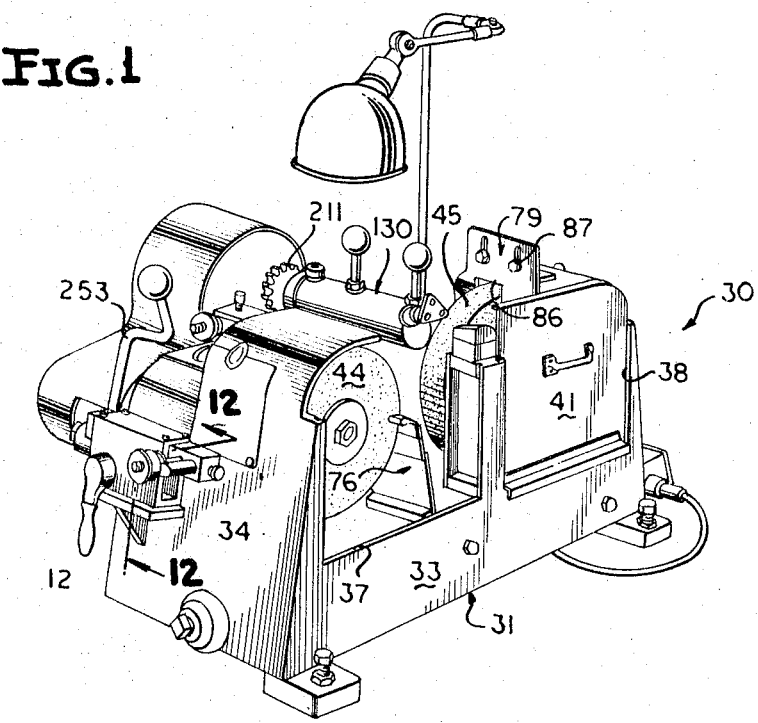
FIGURE 1 is a front perspective view of a novel abrading or honing machine constructed in accordance with this invention, and illustrates a blade carrier arm mounted between a pair of abrading rolls for movement in directions parallel and normal to the abrading wheel axes.
Figure 2:
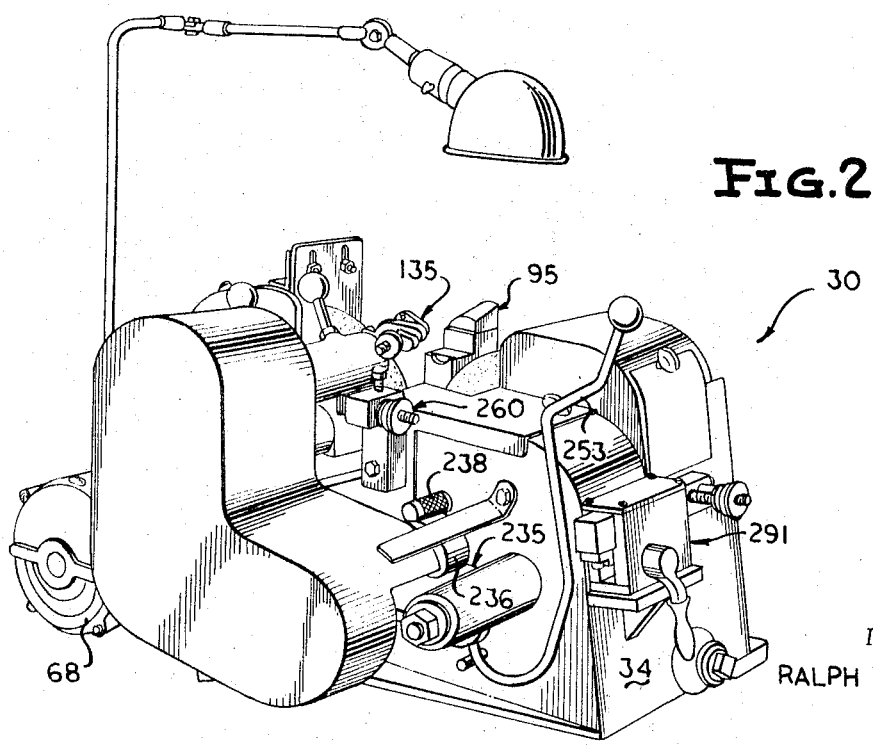
FIGURE 2 is a rear perspective view of the honing machine of FIGURE 1 and illustrates a stop mechanism for limiting and adjusting the swinging movement of the blade carrier and an eccentric-operated clutch for imparting rotation to the blade-carrier arm.

In the example of the embodiment of the invention herein disclosed, the honing machine or abrading apparatus is generally illustrated in FIGURES 1–8 of the drawings and is referred to by the reference numeral 30.

The abrading apparatus 30 includes a housing 31 defined by a bottom 32, a front plate 33, side plates 34, 35 and a rear plate 36. The front plate 33 is slotted at 37, 38 for guidably receiving respective removable plates 40, 41, with the plate 40 being removed in FIGURE 1 to illustrate the access afforded by the plates 40, 41 into an interior of the housing 31.

An intermediate vertical plate 42 is spaced from and is generally parallel to the front plate 33. The intermediate plate 42, the front plate 33 and portions of the side plates 34, 35 define a reservoir 43 for abrading fluid (not shown) such as water, in which is partially immersed a pair of rotatable abrading or grinding wheels 44, 45 each of which has a generally cylindrical abrading surface (unnumbered).

The wheels 44, 45 have shafts 46, 47 respectively which are journalled in a conventional manner between the plates 36, 42. The abrading wheels 44, 45 are each driven in a counter-clockwise direction, as viewed from the front of the housing 31 by a gear mechanism 48.

Figure 3:
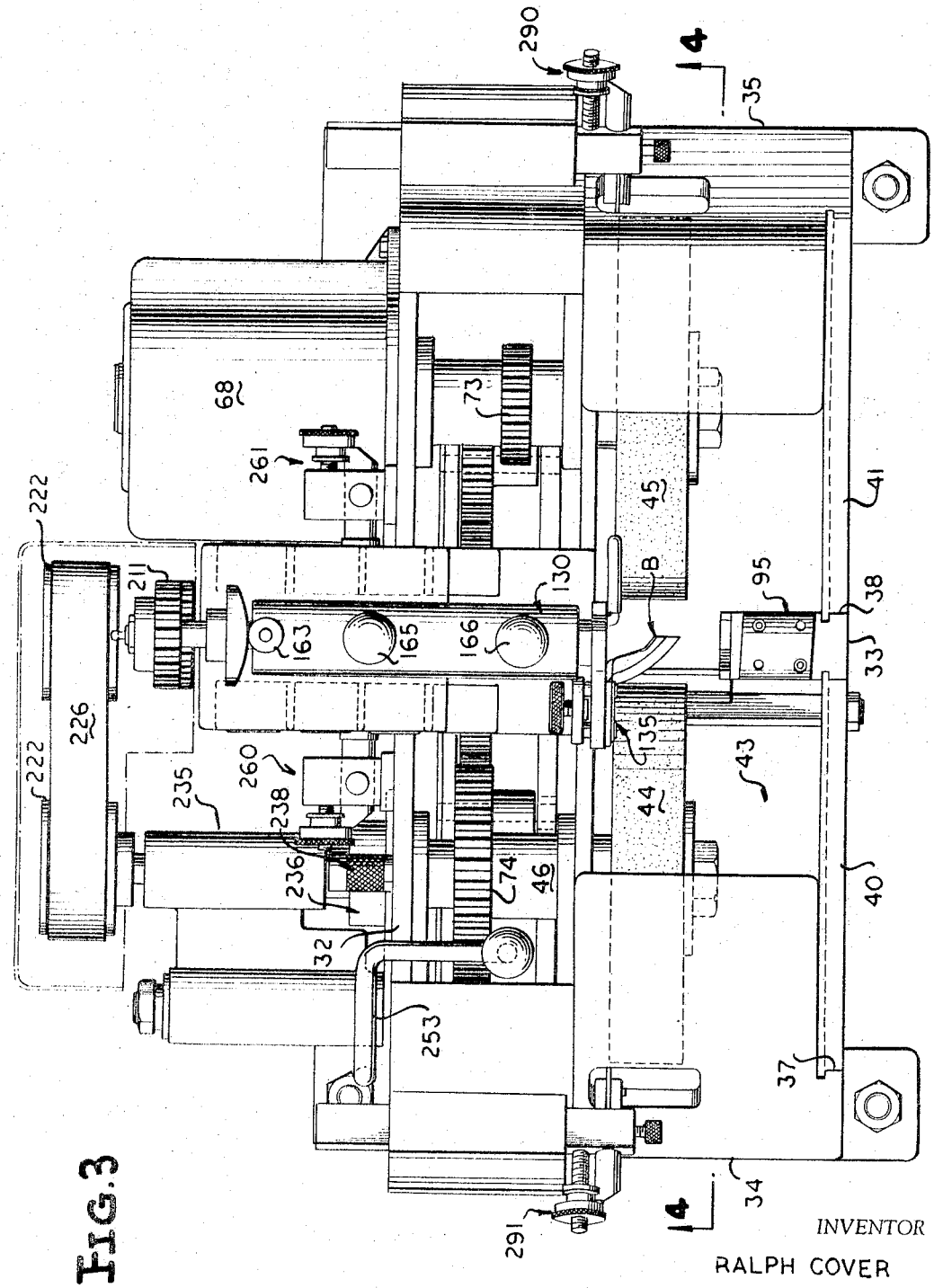
FIGURE 3 is an enlarged top plan view with parts removed for clarity, and illustrates a positioning device for accurately locating a blade carried by the carrier arm prior to the presentation of the blade to the abrading wheels.
Figure 7:
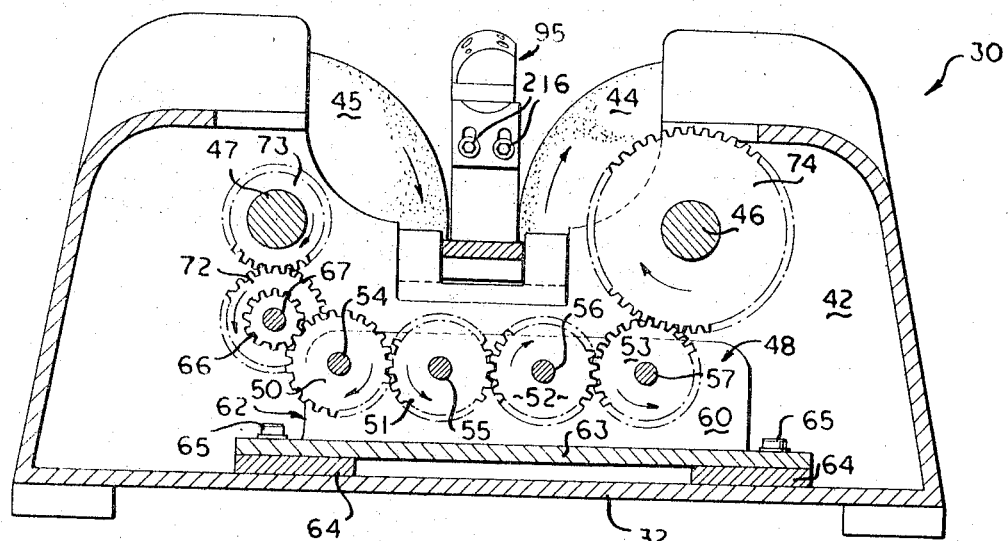
FIGURE 7 is a vertical cross-sectional view taken along line 7—7 of FIGURE 6, and more clearly illustrates the gear mechanism for driving the abrading wheels of the apparatus.

The gear mechanism 48 includes four meshed gears 50, 51, 52 and 53 fixed to respective shafts 54, 55, 56 and 57 each rotatably journalled by identical bearings 58, (FIGURE 6) between a pair of upwardly directed arms 60, 61 of a generally U-shaped gear housing 62. The gear housing 62 has a base plate 63 spaced from the housing bottom plate 32 by feet 64 and secured thereto by identical fasteners 65. The gear 50 is in mesh with a smaller gear 66 (FIGURE 7) fixed to a shaft 67 of an electric motor 68 mounted by a flange 70 and fasteners 71 (FIGURES 5 and 6) to the rear plate 36 of the housing 31. Another larger gear 72 (FIGURES 6 and 7) is fixed to the motor shaft 67 and is in mesh with a gear 73 (FIGURES 3, 6 and 7) secured to the shaft 47 of the abrading wheel 45. The gear 53 is in mesh with a gear 74 secured to the shaft 46 of the abrading wheel 44, as is best illustrated in FIGURES 3 and 7 of the drawings. Upon the driving of the shaft 67 in a counter-clockwise direction as viewed in FIGURE 7 rotation is imparted to the gears 50–53, 66, 72, 73 and 74 in the directions of the arrows in this same figure to rotate the abrading wheels 44, 45 as indicated by the arrows, again in FIGURE 7.

The gear mechanism 48 drives the abrading wheel 45 at approximately 900 r.p.m. while the abrading wheel 44 is driven at a speed of approximately 300 r.p.m. The faster speed of the abrading wheel 45 and the rougher abrading surface thereof (120 grit) preliminarily sharpens a cutter blade B prior to the blade B being sharpened to a smooth, razor-sharp edge by the slower rotating, smoother surfaced (180 grit) abrading wheel 44 in a manner to be described more fully hereinafter.

Figure 4:
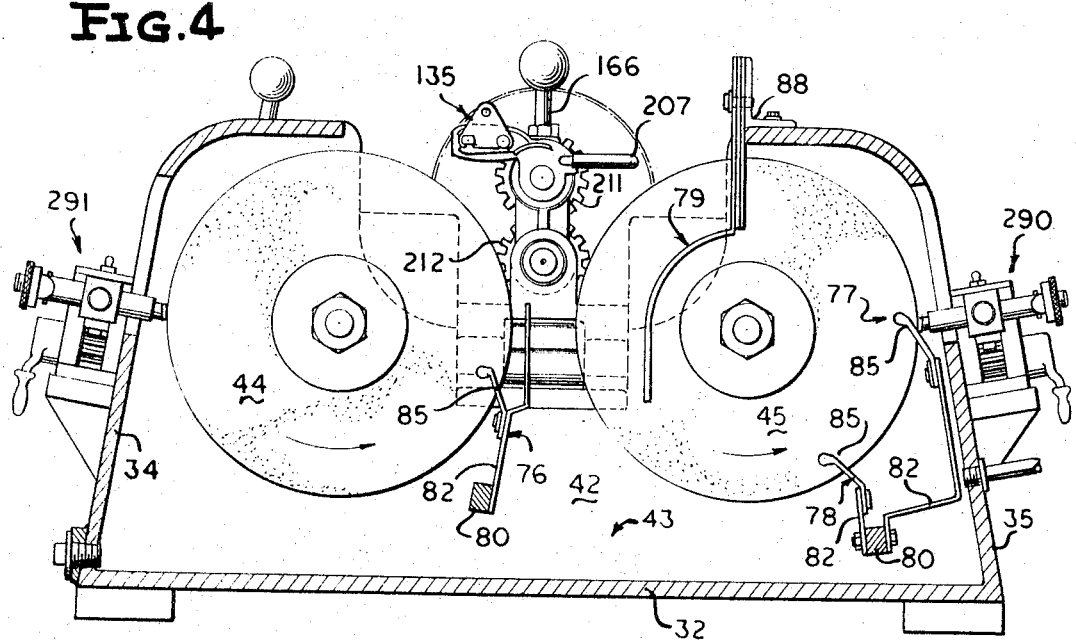
FIGURE 4 is a reduced sectional view taken along line 4—4 of FIGURE 3, and illustrates a plurality of wipers and wheel dressers associated with each of the abrading wheels.

During the rotation of the abrading wheels 44, 45 the fluid (water) in the reservoir 43 is prevented from being thrown outwardly of the housing 31 by the centrifugal force of the wheels 44, 45 by a plurality of guards or wipers 76–79 (FIGURE 4). The wipers 76–78 are substantially identical and each includes a support rod 80 threadably connected as at 81 (FIGURE 6) to the front plate 33 of the housing 31. Metal brackets 82 connected to the rods 80 by fasteners 84 (FIGURE 6) carry flexible wiper blades 85 slotted to embrace the periphery and opposite sides of each of the abrading wheels 44, 45 as is best illustrated by the wiper blade 76 in FIGURE 1 of the drawings.

The wiper 79 is similar to the wipers 76–78 and is slotted at 86 (FIGURE 1) to receive and embrace the sides and periphery of the abrading wheel 45. The wiper 79 is adjustable vertically by a conventional slot and screw arrangement 87, the screws (unnumbered) of which are threaded into a bracket 88 in turn secured by fasteners (unnumbered) to the housing 31.

Mounting means, generally referred to by the reference numeral 90 are provided for normally supporting each blade B between the abrading wheels 44, 45 while permitting both rotation and oscillation of the blade during an abrading or honing operation, as will appear more fully hereafter. The mounting means 90 comprises first mounting means 91 (FIGURES 6 and 7) for swingably moving the blades B between a first position in generally planar alignment with the abrading wheels 44, 45 (FIGURE 6) and a second position (FIGURE 24) overlying a positioning, locating or gaging means 95 at the front plate 33, and a second mounting means 92 to swing the blades B from the position medially of the abrading wheels 44, 45 (solid outline of FIGURE 9) to a position in contact with each (FIGURES 22, 23 and 25).

The first mounting means 91 includes a support plate 96 (FIGURES 6, 8 and 9) bolted as at 97 (FIGURE 8) to centrally recessed portions (unnumbered) of the plates 36, 42. A plate 100 (FIGURE 8) is positioned above and generally parallel to the plate 96. A pair of journals 101, 102 form integral portions of the plate 96 while journals 103, 104 form similar integral portions of the plate 100. An arm 105 is swingably connected to the journals 101, 103 by respective pivot pins 106, 107 and an arm 108 is similarly swingably mounted between the journals 102, 104 by respective pivot pins 110, 111. The first mounting means 91 permits swinging movement of the plate 100 between the solid and phantom outline positions thereof as shown best in FIGURE 8 to present each blade carried thereby to the locating block 95 (FIGURE 24) prior to the honing of such a blade by the abrading wheels 44, 45.

A bolt 112 (FIGURE 8) is threaded in a bore 113 of the plate 96, and a nut 114 is received on the bolt 112 to permit selected adjustment of the bolt 112 in a known manner. By selectively adjusting the bolt 112, a head 115 thereof abuts the portion of the arm 105 embracing the pivot pin 107 to limit the right-to-left swinging movement of the plate 100 as viewed in FIGURE 8 of the drawings to accurately position a blade in a plane through the abrading wheels 44, 45 for presentation thereto during a honing operation.

A mechanism 120 is carried by the plate 100 (FIGURE 8) for absorbing impact shocks upon the movement of the plate 100 from the phantom outline position in FIGURE 8. The shock absorbing mechanism 120 includes a headed stud 121 threaded into a bore 122 and adjusted therein by a nut 123. A flange cap 124 surrounds the stud 121 beneath the plate 100 and a spring 125 surrounds the cap 124 and normally urges the same downwardly towards the journal 102. As the plate 100 is pivoted toward the position thereof shown in solid lines in FIGURE 8 the cap 124 first contacts the upper portion of the journal 102 and is urged upwardly against the bias of the spring 125 until gradual contact is established between either the head (unnumbered) of the stud 121 and the journal 102, or between the head 115 of the stud 112 and the portion of the arm 105 surrounding the pivot pin 107.

The second mounting means 92 includes a sleeve 130 rotatably and slidably mounting a support arm 131 having an end portion 132 which carries a blade carrier 135 which will be described more fully hereafter and upon which a single blade B is secured and carried for presentation the locating means 95 and the abrading wheels 44, 45 during a honing operation of the apparatus 30. The sleeve 130 includes a depending journal 133 having a bore 134. A pivot pin 136 is keyed at 137 to the journal 133, and is journaled by anti-friction bearings of a conventional construction, as at 140, 141 to respective journals 142, 143 carried by the plate 100. This journalling of the sleeve 130 permits the same to be swung generally normally to the axes of the abrading wheels 44, 45 to selectively bring the blade B into contact with the peripheral abrading surfaces (unnumbered) of these wheels during a honing operation, as will be more apparent hereinafter.

Conventional seals 145, lubricating passages 146, 147 and lubricating fittings 148, 150 permit the introduction and retention of lubricating media, such as heavy oil or grease, in the anti-friction bearings 140, 141.

The arm 131 is freely rotatably journaled in a bore 151 of the sleeve 130 by a pair of anti-friction bearings 152, 153 spaced by sleeves 154, 155. Retainers 156, 157 maintain the bearings 152, 153 and the sleeves 154, 155 in the bore 151 of the sleeve 130 in the position thereof best illustrated in FIGURE 8 of the drawings.

The end portion 132 of the arm 131 carrying the blade carrier 135 is normally urged from left-to-right by a spring 159 mounted between a collar 158 fixed in the sleeve 130 and a flange or reduced portion (unnumbered) of the blade carrier 135. This left-to-right biasing of the arm 135 urges a cam 160 secured by a pin 161 to an opposite end portion 162 of the arm 131 into contact with a cam follower or roller 163 freely rotatably journaled upon the sleeve 130 (FIGURE 8). The follower or roller 163 follows a contoured annular cam surface 164 of the cam 160 to oscillate or reciprocate the arm 131 as the arm 131 is rotated in a manner to be described more fully hereinafter.

A pair of handles 165, 166 are threadably fixed to the sleeve 130 for manually advancing the blade carrier 135 and the blade B carried thereby toward and away from the positioning or locating means 95, and toward and away from the abrading wheels 44, 45 in respective first and second directions generally normal to each other.

The blade carrier 135 is best illustrated in FIGURES 16, 17 and 19, and comprises a base or body 172 having a circular opening 170 for receiving the end portion 132 (FIGURE 8) of the arm 131 and a radial bore 171 for receiving a fastening key or pin (not shown) for securing the body 172 to the arm 135 in a manner shown in FIGURE 8. The body 172 of the blade carrier 135 carries means 175 for adjustably securing and supporting the blade B thereupon. The adjusting and supporting means 175 includes three bores 176, 177 and 178, the latter two of which freely slidably receive respective pins 180, 181 headed at 182, 183 respectively. The bore 176 receives an end portion 184 of a member 185 threaded in a plate 186 to which the pins 180, 181 are fixed. The member 185 carries a knurled head 187. The blade B is fixed to the body 172 of the carrier 135 by positioning a notch N and an opening O of a shank S of the blade or cutter B upon the respective pins 180, 181. A keeper 188 is thereafter positioned with notches 190, 191 thereof embracing the respective pins 180, 181 between the shank S of the blade B and the heads 182, 183. Upon the manual rotation of the knurled head 187, the plate 186 draws the pins 180, 181 upwardly, as viewed in FIGURE 17, to clamp the shank S of the blade B between the keeper 188 and the body 172 of the blade carrier means 135.

Prior to securing the blade B upon the carrier 135, the blade is axially positioned or located by the locating means 95 at the front plate 33 of the housing 31. The locating means 95, as is best illustrated in FIGURES 3, 6, 7, and 18 of the drawings, includes a body 200 having a convex positioning surface 201 which complements a concave interior surface I of the blade B. The body 200 is secured by fasteners (not shown) to a bracket 203 which is in turn vertically adjustably secured by slots 205, and bolts 206 to a plate 204 fixed to the front plate 33 of the housing 31. To adjust the blades B, either or both of the handles 165, 166 is/are grasped and the sleeve 130 is manually moved from the solid position thereof shown in FIGURE 8 to the position shown in FIGURE 24 with the surface I of the blade B overlyingly contacting the surface 201 of the locating body 200. A handle 207 (FIGURES 16 and 17) secured to the body 172 of the blade carrier 135 is then grasped and manipulated to bring the concave surface I of the blade B into positive intimate contact with the surface 201 at which point the blade B is prepositioned accurately for subsequent abrading or honing by the abrading wheels 44, 45. The mechanism 175 is then actuated by rotating the knurled head 187 in the manner heretofore described to secure the blades B in the position shown in FIGURE 24 while still on and positioned by the locating means 95.

Means generally referred to by the reference numeral 210 is provided for rotating the arm 131 and the blade B carried thereby during an abrading operation of the apparatus 30. The blade B must be rotated because of the generally helical configuration of a cutting edge E thereof, and by both the oscillation imparted to the blade B by the cam means 160, 163 and the rotation by the means 210, accurate honing of each blade edge E is effected. The means 210 (FIGURES 3, 5, 8 and 20) includes three meshed gears 211, 212 and 213 respectively carried by the end portion 162 of the arm 131, the pivot pin 136 and a pin 214 (FIGURE 8) fixed to a vertical plate 215. The vertical plate 215 is in turn fixed by fasteners 216 (FIGURES 5 and 8) to a horizontal plate 217 secured by fasteners 218 to the underside of the plate 96. The gears 212 and 213 are journalled by anti-friction bearings 220, 221 respectively to the pins 136 and 214.

A driven pulley 222 is rotatably journaled by an anti-friction bearing 223 upon the pin 214 and is fixed by means not shown to the gear 213. A suitable fitting 224 and passage means 225 facilitate the introduction of suitable lubricating media, such as heavy oil or grease, to the anti-friction bearings 221 and 223.

A pulley belt 226 is entrained about a pulley 222 and a drive pulley 227 keyed to one end 228 of a shaft 230 (FIGURE 20). The shaft 230 is rotatably mounted by anti-friction bearings 231, 232 and a spacing sleeve 233 in a bore 234 of a swingable bracket 235. An end (unnumbered) of the shaft 230 opposite the end 228 carries a drive roller 236 whose periphery 237 is swingable into contact with a knurled rotatable drive member 238 projecting outwardly of the rear plate 36 through an opening 240 therein. A shaft 241 of the drive member 238 is conventionally connected by means not shown to the shaft 46 or any of the other shafts of the gear mechanism 48 for imparting rotation to the drive member 238.

The bracket 235 (FIGURES 5 and 20) is journalled for swinging or pivoting movement about a pivot pin 242 by a pair of anti-friction bearings 243, 244 and a spacer sleeve 245 received in a bore 246 of the bracket 235. The pivot pin 242 is fastened by conventional means 247 to the rear plate 36 of the housing 31.

Figure 5:
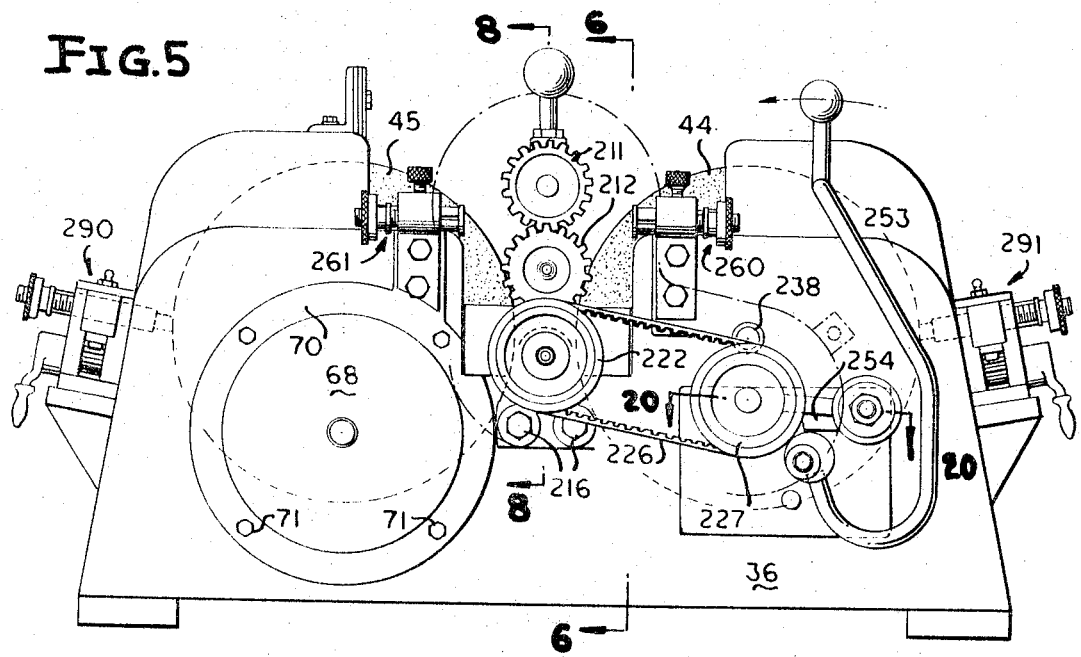
FIGURE 5 is a rear elevational view with a cover plate of the machine being removed for clarity, and illustrates a drive connection for rotating the blade carrier arm duing a honing or abrading operation.
Figure 6:
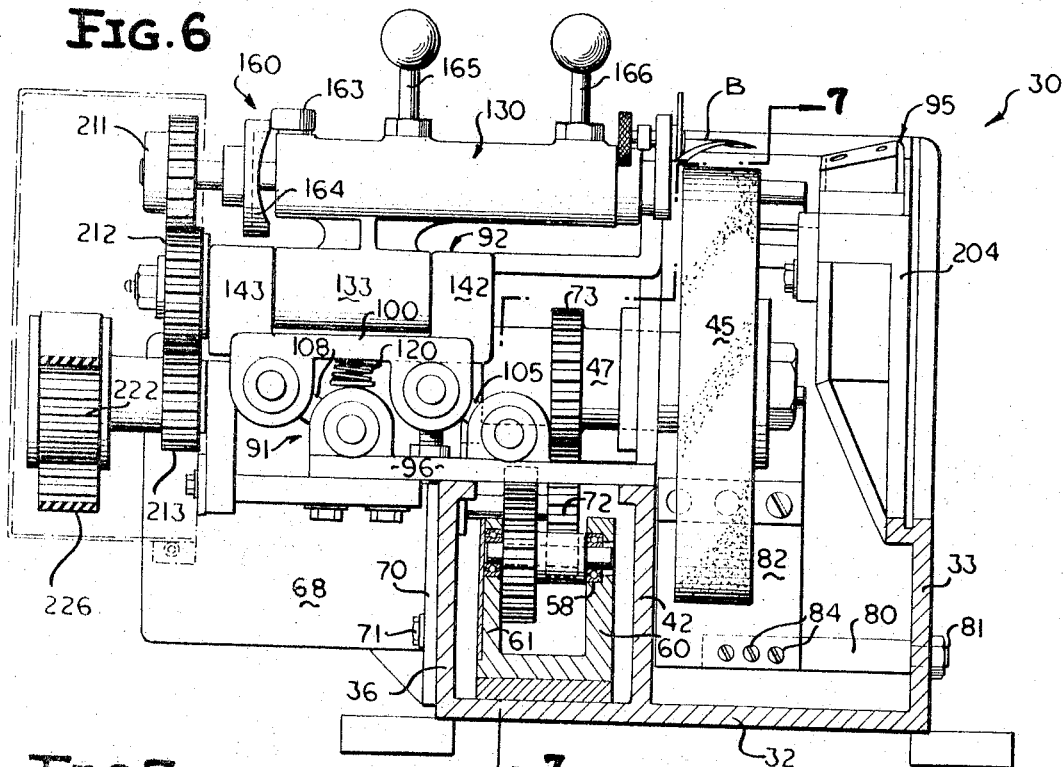
FIGURE 6 is a vertical longitudinal sectional view taken generally along lines 6—6 of FIGURE 5, and illustrates mounting means for moving the blade-carrying arm in directions parallel and normal to the wheel axes and a gear mechanism for imparting rotation to the abrading wheels.

An eccentric or cam mechanism 250 is mounted beneath the bracket 235, as viewed in FIGURE 5 of the drawings, and includes an eccentric 251 mounted by a threaded stud 252 to the rear plate 36 of the housing 31. A handle 253 is secured to the eccentric 251 for manipulating the eccentric 251 to bring the periphery 237 of the roller 236 into friction driving contact with the drive member 238 to rotate the shaft 230 and the elements drivably connected thereto for rotating the blade B during an abrading operation. That is, by moving the handle 253 in the direction of the arrow in FIGURE 5, the eccentric 251 contacts a wedge-like portion 254 of the bracket 235 causing a clockwise pivoting thereof about the pin 242 as viewed in this figure. The periphery 237 of the roller 236 contacts the rotating drive member 238 and is rotated thereby to cause rotation of the pulley 227 and the pulley belt 226 entrained thereabout. The pulley belt 226 in turn drives the pulley 223 which in turn rotates the gears 213, 212 and 211, the latter rotating the shaft or arm 131 and the blade B carried thereby. As the arm 131 rotates, the follower 163 follows the cam surface 164 under the influence of the spring 159 (FIGURE 8) thereby reciprocating or oscillating the blade B simultaneously with the rotation thereof. This combined rotating and oscillating of the blade B effects the sharpening thereof in a manner graphically illustrated in FIGURES 22, 23 and 25–29 of the drawings.

In FIGURE 25 the edge E of the blade B is shown in initial contact with the abrading surface of the coarse abrading wheel 45 at the time the high side of the cam surface 164 is in contact with the follower 163. At this point, the blade B is at the further rightmost position relative to the abrading surface of the abrading wheel 45. As the arm 131 is rotated by the gear 211 the follower 163 approaches the low side of the cam surface 164 causing a simultaneous right-to-left movement of the arm 131 as viewed in FIGURE 8 and rotation of the blade carrier 135, thus both withdrawing and rotating the blade B as shown in FIGURE 28 of the drawings. This reciprocation and rotation of each of the blades B relative to first the coarser of the abrading wheels 45 and thereafter to the finer of the abrading wheels 44 by shifting the sleeve 130 to the lefthandmost position in FIGURE 9 achieves an accurate extremely razor sharp cutting edge E, noting that the rotation of each of the wheels 44, 45 is against the rotation of the blade B and from the shank S toward the tip to prevent digging in of the blade edge E and sharpening to the extreme edge of the blade tip.

As the sleeve 130 is swung from the central position thereof shown in FIGURE 9 to either of the positions illustrated in phantom outline in the same figure to present the blade B to the wheels 44, 45, the amount of in-feed of the blades B is regulated by identical adjustable stop means 260, 261 positioned for abutting contact with the sleeve 130 to prevent overtravel thereof toward the abrading wheels 44, 45. Each of the stop means 260 is identical and includes a body 262 secured by fasteners 263 to an upper portion of the housing rear plate 36 at either side of the sleeve 130. The bodies 262 are each bored at 264 for receiving an adjustable abutment member 265 having a keyway 266 and a head 267. A pin 268 projects radially inwardly of the bore 264 and rides in the keyway 266 of the member 265. The body 262 of each of the stop means 260, 261 is provided with a threaded bore 270 parallel to the bore 264. A threaded member 271 is threaded in the bore 270 and immovably secured therein by a pin 272. A knurled member 273 is threaded on the threaded member 271 and includes a flange 275 received in a complementary slot 276 of the abutment member 265. As the knurled member 273 is rotated clockwise or counterclockwise relative to the threaded member 271, the flange 275 cooperating with the slot 276 advances or retracts each of the abutment members 265 relative to the sleeve 130 to limit the in-feed of the blades B toward the abrading wheels 44, 45. Thus, by rotating the knob 273 to a desired setting within 0.0005 inch and tightening a single radial fastening member 277 (FIGURE 10) accurate and rapid microadjustment of blade in-feed for each of the abrading wheels 44, 45 is effected.

Wheel dressers 290 and 291 (FIGURE 4) are provided for dressing the respective abrading wheels 45, 44. The wheel dressers 290, 291 are identical, and the following description of the wheel dresser 291 as is best shown in FIGURES 12–15 of the drawings is considered sufficient for a complete understanding of the wheel dresser 290.

The wheel dresser 291 includes a housing 292 fastened in a conventional manner adjacent an opening 293 providing access through the side plate 34 of the housing 31 to the abrading wheel 44. A bar-like member 294 carrying a rack 295 fastened to an underside thereof by fasteners 296 is reciprocal in the housing 292 in a direction generally parallel to the axis of the abrading wheel 44. The member 294 is moved parallel to the abrading wheel axis by a worm 296 in mesh with the rack 295 and a manually operable handle 297 keyed by a radial set screw 298 to a stud 300 fixed in a conventional manner to the worm 296.

The bar-like member 294 carries a slidable member 301 having a bored end portion 302 receiving an insert 303 terminating in a diamond dresser 304. Set screws 305 (FIGURE 14) secure the insert 303 to the end portion 302. The slidable member 301 is adjusted radially inwardly and outwardly relative to the abrading surface of the abrading wheel 44 by a threaded stud 306, a thumb nut 307 flanged at 308 and received in a complementary groove 310 of the member 301, in the same manner as the flange 275 and groove 276 of the stop means 260 and 261 of FIGURES 9–11 of the drawings. The threaded member 306 is fixed by a pin 311 in a bore 312 of the bar member 294 and by rotating the thumb nut 307 the slidable member 301 is adjusted and locked in a selected position of adjustment by a radial set screw 313 to fix the diamond dresser 304 relative to the periphery of the abrading wheel 44. Once the particular adjustment of the diamond dresser 304 has been made, the handle 297 is manipulated to reciprocate the rack across the abrading surface of the abrading wheel 44 to dress the same while the wheel 44 is rotating in a manner well known in the prior art.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. In apparatus of the character described, a pair of abrading wheels presenting cylindriform abrading surfaces, means for rotating said wheels, a blade carrier arm between and parallel to the axes of said wheels, blade supporting means on said arm for supporting a blade, a gage block having a gage surface for accurately positioning a blade carried by said arm for subsequent presentation to the wheels, first means mounting said arm for movement toward and away from said gage block, and second means mounting said arm for movement toward and away from each of said wheels.

2. In apparatus for sharpening blades each having a cutting edge forming a part of a helix, a pair of abrading wheels each presenting generally cylindriform abrading surfaces, means for rotating said wheels, a support arm, means mounting the arm for moving a free end portion of the arm toward and away from said abrading surfaces, a blade carrier supported at the free end portion of said arm, means for supporting a blade on the carrier with its helical edge projecting in the general direction of the wheel axes, means for oscillating said arm in a direction generally parallel to the wheel axes, and means for at least partially rotating said arm during the oscillation thereof by said oscillating means.

3. In apparatus for sharpening blades each having a cutting edge forming a part of a helix, a pair of abrading wheels each presenting generally cylindriform abrading surfaces, means for rotating said wheels, a support arm, first means mounting the arm for movement toward and away from said abrading surfaces, second means mounting the arm for movement toward and away from said abrading surfaces in a direction generally normal to the direction of movement of the arm by the first mounting means, a blade carrier supported at a free end portion of said arm, means for supporting a blade on the carrier with its helical edge projecting in the general direction of the wheel axes, means for oscillating said arm in a direction generally parallel to the wheel axes and means for at least partially rotating said arm during the oscillation thereof by said oscillating means.

4. In apparatus for sharpening blades each having a cutting edge forming a part of a helix, a pair of abrading wheels, means for rotating said wheels, a support arm, means mounting the arm for moving a free end portion of the arm along a path parallel to the wheel axes between a first position generally between the wheels and a second position beyond the wheels, a blade carrier supported at the free end portion of the arm, means for supporting a blade on the carrier with its helical edge projecting in the general direction of the wheel axes, means for oscillating said arm in a direction generally parallel to the wheel axes, means for at least partially rotating said arm during the oscillation thereof, and means for preventing the rotation of said arm when said free end portion is at said second position.

5. The apparatus as defined in claim 4 including means for accurately positioning blades on said carrier at said second position.

6. In apparatus for sharpening blades each having a cutting edge forming a part of a helix, a pair of abrading wheels each presenting generally cylindriform abrading surfaces, means for rotating said wheels, a support arm, first means mounting the arm for first movement parallel to the wheel axes, second means mounting the arm for swinging movement toward and away from said abrading surfaces in a direction generally normal to the direction of the first movement, a blade carrier supported at a free end portion of said arm, means for supporting a blade on the carrier with its helical edge projecting in the general direction of the wheel axes, means remote from said free end portion for rotating said arm, cam and cam follower means for oscillating said arm in a direction parallel to the wheel axes during the rotation thereof, and positioning means for accurately positioning a blade upon said carrier for accurate presentation to said abrading surfaces.

7. The apparatus as defined in claim 6 wherein said rotating means includes a driven gear carried by said arm and a driving gear in mesh with said driven gear during the swinging movement of said arm by said second mounting means.

8. The apparatus as defined in claim 6 including means for dressing said wheels.

9. The apparatus as defined in claim 6 including means for adjustably limiting the swinging movement of said arm toward said abrading surfaces.

10. In apparatus for sharpening blades each having a cutting edge forming a part of a helix, a pair of abrading wheels each presenting generally cylindriform abrading surfaces, means for rotating said wheels, a support arm, a blade carrier supported at a free end portion of said arm, means for supporting a blade on the carrier with its helical edge projecting in the general direction of the wheel axes, first means mounting the arm for first movement parallel to the wheel axes between a first position at which said carrier is in a plane generally common to said wheels and a second position beyond said wheels, positioning means at said second position for positioning each blade upon the carrier for accurate presentation thereof to the abrading surfaces of the wheels, second means mounting the arm for swinging movement toward and away from said abrading surfaces in a direction generally normal to the direction of the first movement, means for rotating said arm, cam and cam follower means for oscillating said arm in a direction parallel to the wheel axes during the rotation thereof with the carrier in said first position, means for adjustably limiting the swinging movement of said arm toward said abrading surfaces, and means for terminating the rotation of said arm.

11. The apparatus as defined in claim 10 including reservoir means for housing abrading fluid in which the wheels are partially immersed, and means for breaking the surface tension between the fluid and wheels during the rotation of the latter to prevent splashing of the fluid.

12. The apparatus as defined in claim 10 wherein the means for terminating the rotation of the arm includes eccentrically mounted means manually movable between at least two positions for terminating and initiating the rotation of said arm.

13. The apparatus as defined in claim 10 including gear means for rotating said wheels in the same direction.

14. The apparatus as defined in claim 10 including means for dressing said wheels.

15. The apparatus as defined in claim 10 including means for adjustably positioning said carrier at said first position.

16. In apparatus of the character described, a pair of abrading wheels presenting cylindriform abrading surfaces, means for rotating said wheels, a blade carrier arm between and parallel to the axes of said wheels, blade supporting means on said arm for supporting a blade, a gage block having a gage surface for accurately positioning a blade carried by said arm for subsequent presentation to the wheels, first means mounting said arm for movement toward and away from said gage block, second means mounting said arm for movement toward and away from each of said wheels, means for rotating said blade carrier arm, said arm rotating means including a first gear carried by said arm and a second gear in mesh with said first gear at each position of said second mounting means.

17. In apparatus of the character described a pair of abrading wheels presenting cylindriform abrading surfaces, means for rotating said wheels, a blade carrier arm between and parallel to the axes of said wheels, blade supporting means on said arm for supporting a blade, a gage block having a gage surface for accurately positioning a blade carried by said arm for subsequent presentation to the wheels, first means mounting said arm for movement toward and away from said gage block, second means mounting said arm for movement toward and away from each of said wheels, means for rotating said blade carrier arm, said arm rotating means comprising a driven gear carried by said arm, an intermediate gear in mesh with said driven gear, a driving gear in mesh with said intermediate gear, the axes of said gears normally occupying a vertical plane, said driven gear being shiftable by said second mounting means to a position with its axis removed from said vertical plane, and said driven and intermediate gears remaining in mesh during the movement of said driven gear by said second mounting means.

18. The apparatus as defined in claim 17 wherein said driving and intermediate gears are taken out of mesh during the movement of said arm by said first mounting means toward said gage block.

19. In apparatus of the character described, a pair of abrading wheels presenting cylindriform abrading surfaces, means for rotating said wheels, a blade carrier arm between and parallel to the axes of said wheels, blade supporting means on said arm for supporting a blade, a gage block having a gage surface for accurately positioning a blade carried by said arm for subsequent presentation to the wheels, first means mounting said arm for movement toward and away from said gage block, second means mounting said arm for movement toward and away from each of said wheels, one of said pair of abrading wheels having a coarse grit composition and the other of said blades having a fine grit composition, and said rotating means including speed regulating means for rotating said abrading wheels at different relative speeds.

20. In apparatus for the character described, a plurality of abrading wheels having abrading surfaces, means for rotating said wheels about generally spaced parallel axes thereof, a blade carrier means between and parallel to the wheel axes, blade supporting means forming a portion of said blade carrier means for supporting a blade, gage means for accurately positioning a blade carried by said blade supporting means for presentation to the abrading wheels, first means mounting said blade carrier means for movement toward and away from said gage means, second means mounting said blade carrier means for movement toward and away from each of said abrading wheels, drive means for rotating said blade carrier means, said drive means including at least driven, intermediate and driving gears, said driven gear being carried by said blade carrier means, the axes of said gear normally occupying a common plane, said driven and intermediate gears being at all times in mesh during the movement of said blade carrier means by said first and second mounting means, and said driving and intermediate gears being normally in mesh but are taken out of mesh upon the movement of said blade carrier means toward said gage means by said second mounting means.

References Cited
UNITED STATES PATENTS

| | | | |
|---|---|---|---|
| 2,127,210 | 8/1938 | Dunbar | 51—95 |
| 2,491,346 | 12/1949 | Wetzel | 51—95 |
| 2,510,557 | 6/1950 | Cover | 51—96 |
| 3,019,562 | 2/1962 | Price | 51—3 |

ROBERT C. RIORDON, *Primary Examiner.*

D. G. KELLY, *Assistant Examiner.*